(12) United States Patent
Srivastava

(10) Patent No.: US 9,274,226 B2
(45) Date of Patent: Mar. 1, 2016

(54) SYNCHRONOUS NETWORK DEVICE TIME TRANSFER FOR LOCATION DETERMINATION

(71) Applicant: QUALCOMM Incorporated, San Diego, CA (US)

(72) Inventor: Aditya N. Srivastava, Fremont, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 467 days.

(21) Appl. No.: 13/791,864

(22) Filed: Mar. 8, 2013

(65) Prior Publication Data

US 2014/0253373 A1    Sep. 11, 2014

(51) Int. Cl.
*G01S 19/05* (2010.01)
*G01S 5/00* (2006.01)

(52) U.S. Cl.
CPC ............. *G01S 19/05* (2013.01); *G01S 5/0072* (2013.01)

(58) Field of Classification Search
CPC ......... G01S 19/05; G01S 19/01; G01S 19/48; G01S 19/25; G01S 5/0072
USPC .............. 342/357.42, 357.39, 357.31, 357.64
See application file for complete search history.

(56) References Cited

U.S. PATENT DOCUMENTS

| | | |
|---|---|---|
| 2002/0098849 A1 | 7/2002 | Bloebaum et al. |
| 2005/0090201 A1 | 4/2005 | Lengies et al. |
| 2006/0267841 A1 | 11/2006 | Lee et al. |
| 2006/0279457 A1 | 12/2006 | Oster |
| 2007/0024498 A1* | 2/2007 | Korneluk et al. ........ 342/357.09 |
| 2010/0066599 A1 | 3/2010 | Liu et al. |
| 2011/0018761 A1* | 1/2011 | Walley et al. ............ 342/357.28 |
| 2012/0265818 A1 | 10/2012 | Van et al. |
| 2012/0295623 A1* | 11/2012 | Siomina et al. ............... 455/436 |
| 2014/0035782 A1* | 2/2014 | Fischer et al. ........... 342/357.43 |

FOREIGN PATENT DOCUMENTS

| | | |
|---|---|---|
| WO | WO-2006134414 A1 | 12/2006 |
| WO | WO-2008033785 A2 | 3/2008 |

OTHER PUBLICATIONS

International Search Report and Written Opinion—PCT/US2014/020047—ISA/EPO—Mar. 4, 2015.

\* cited by examiner

*Primary Examiner* — Harry Liu
(74) *Attorney, Agent, or Firm* — Berkeley Law & Technology Group, LLP

(57) ABSTRACT

Examples disclosed herein relate to a method performed at a first mobile station that includes receiving a request for positioning assistance data from a second mobile station over a communication link; and transmitting one or more messages to the second mobile station in response to the request, wherein the one or more messages include the requested positioning assistance data, wherein the first mobile station is on a synchronous network.

19 Claims, 7 Drawing Sheets

SYNCHRONOUS NETWORK DEVICE TIME TRANSFER FOR LOCATION DETERMINATION

BACKGROUND

1. Field

The subject matter disclosed herein relates to communication, and more specifically to techniques for performing location determination in a wireless communication network.

2. Information

Wireless position determination systems may be used to determine the location of a device. The device may be a mobile or portable device that operates on battery power. A mobile handset may obtain a position fix by processing signals received from satellite transmitters of a satellite positioning system (SPS), for example. Usefulness of such signals for a mobile device in determining a position fix may depend, at least in part, on availability or accuracy of a time signal.

Accuracy of time on asynchronous network-based mobile devices may be substantially lower than that of synchronous network devices. SPS functionality of a mobile device may benefit from having a relatively accurate time on the mobile device. For example, a sufficiently accurate time on a mobile device may allow for relatively fast or accurate position fixes while reducing battery usage.

SUMMARY

In one implementation, a method for location determination may method comprise, at a first mobile station: receiving a request for positioning assistance data from a second mobile station over a communication link; and transmitting one or more messages to the second mobile station in response to the request, wherein the one or more messages include the requested positioning assistance data, wherein the first mobile station is on a synchronous network, wherein the requested positioning assistance data comprises at least a current time according to the synchronous network and a time uncertainty.

In another implementation, a mobile station may comprise: a receiver to receive a request for positioning assistance data from another mobile station over a communication link; and a transmitter to transmit one or more messages to the another mobile station in response to the request, wherein the one or more messages include the requested positioning assistance data, wherein the mobile station is on a synchronous network, wherein the requested positioning assistance data comprises at least a current time according to the synchronous network and a time uncertainty.

In yet another implementation, an article may comprise: a storage medium of a first mobile station comprising machine-readable instructions stored thereon which are executable by a special purpose computing apparatus to: process a request for positioning assistance data from a second mobile station over a communication link; and initiate transmission of one or more messages to the second mobile station in response to the request, wherein the one or more messages include the requested positioning assistance data, wherein the first mobile station is on a synchronous network.

In yet another implementation, a mobile station may comprise: means for receiving a request for positioning assistance data from another mobile station over a communication link; and means for transmitting one or more messages to the another mobile station in response to the request, wherein the one or more messages include the requested positioning assistance data, wherein the mobile station is on a synchronous network.

In still another implementation, a method for location determination may comprise, at a first mobile station: transmitting a broadcast message through a wireless communication link requesting positioning assistance data; receiving, in response to the broadcast message, one or more response messages from a second mobile station on a synchronous network, wherein the one or more response messages include the requested positioning assistance data; and applying the positioning assistance data to acquisition of a network signal.

In still another implementation, a mobile station may comprise: a transmitter to transmit a broadcast message through a wireless communication link requesting positioning assistance data; a receiver to receive, in response to the broadcast message, one or more response messages from another mobile station on a synchronous network, wherein the one or more response messages include the requested positioning assistance data; and a processor to: apply the positioning assistance data to acquisition of a satellite positioning system (SPS) signal.

In yet another implementation, an article may comprise: a storage medium comprising machine-readable instructions stored thereon which are executable by a special purpose computing apparatus to: initiate transmission of a broadcast message through a wireless communication link requesting positioning assistance data; apply positioning assistance data to acquisition of a satellite positioning system (SPS) signal, wherein the positioning assistance data is included in one or more response messages received in response to the broadcast message from another mobile station on a synchronous network.

In yet another implementation, a mobile station may comprise: means for transmitting a broadcast message through a wireless communication link requesting positioning assistance data; means for receiving, in response to the broadcast message, one or more response messages from another mobile station on a synchronous network, wherein the one or more response messages include the requested positioning assistance data; and means for applying the positioning assistance data to acquisition of a satellite positioning system (SPS) signal.

In still another implementation, a method for location determination may comprise, at a first mobile station: transmitting a broadcast message through a wireless communication link requesting positioning assistance data; receiving, in response to the broadcast message, one or more response messages from a second mobile station and a third mobile station on a synchronous network, wherein the one or more response messages include the requested positioning assistance data comprising a first time uncertainty corresponding to the second mobile station and a second time uncertainty corresponding to the third mobile station: and comparing the first and second time uncertainties to determine whether to apply the positioning assistance data of the second mobile station or the third mobile station to acquisition of a satellite positioning system (SPS) signal.

BRIEF DESCRIPTION OF THE FIGURES

Non-limiting and non-exhaustive examples will be described with reference to the following figures, wherein like reference numerals refer to like parts throughout the various figures.

DETAILED DESCRIPTION

Figure 1:
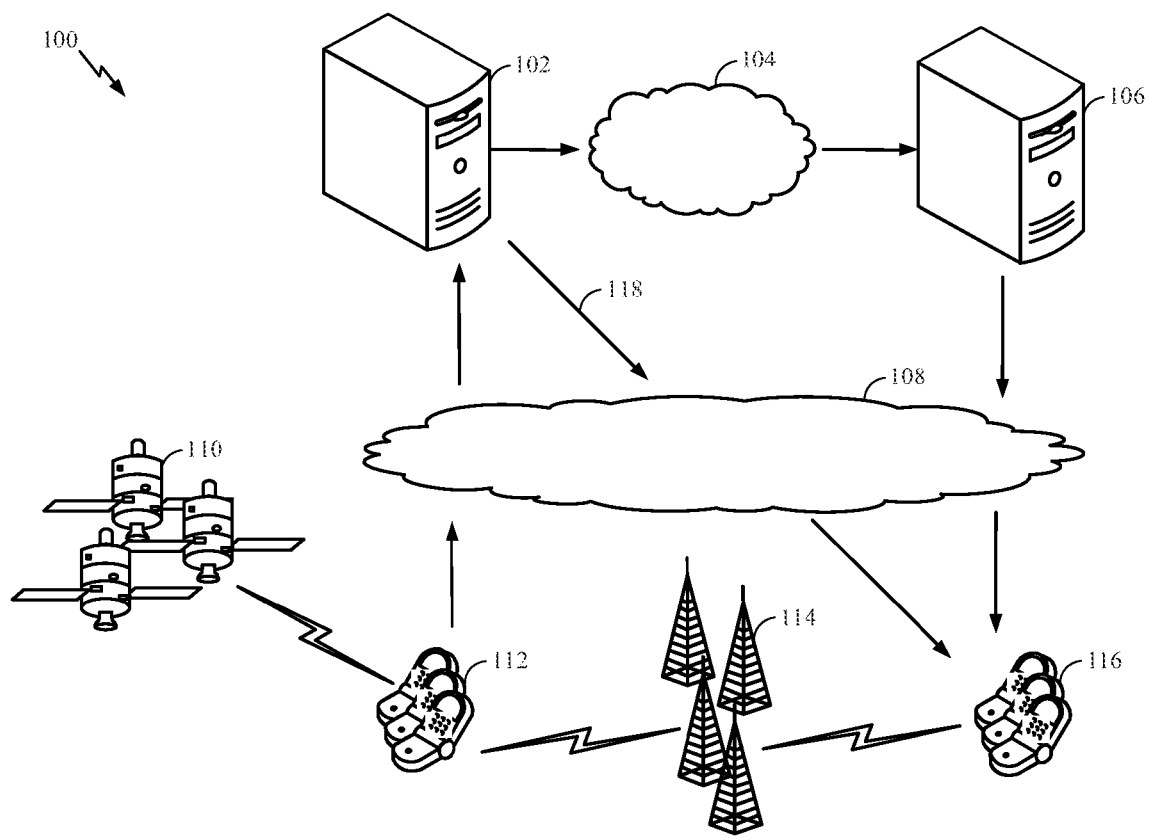
FIG. 1 is a schematic diagram of a communication network, according to an implementation.

Reference throughout this specification to "one example", "one feature", "an example" or "a feature" means that a particular feature, structure, or characteristic described in connection with the feature and/or example is included in at least one feature and/or example. Thus, the appearances of the phrase "in one example", "an example", "in one feature", or "a feature" in various places throughout this specification are not necessarily all referring to the same feature and/or example. Furthermore, the particular features, structures, or characteristics may be combined in one or more examples and/or features.

As used herein, a mobile station (MS) refers to a device such as a cellular or other wireless communication device, personal communication system (PCS) device, personal navigation device, Personal Information Manager (PIM), Personal Digital Assistant (PDA), laptop or other suitable mobile station which is capable of receiving wireless communications. The term "mobile station" is also intended to include devices which communicate with a personal navigation device (PND), such as by short-range wireless, infrared, wireline connection, or other connection—regardless of whether satellite signal reception, assistance data reception, and/or position-related processing occurs at the device or at the PND. Also, "mobile station" is intended to include all devices, including wireless communication devices, computers, laptops, etc. which are capable of communication with a server, such as via the Internet, WiFi, or other network, and regardless of whether satellite signal reception, assistance data reception, and/or position-related processing occurs at the device, at a server, or at another device associated with the network. Any operable combination of the above are also considered a "mobile station." In some embodiments, a mobile station comprises a device omitting components and/or functionality for wireless communications.

The Global Positioning System ("GPS") and other like satellite positioning systems (SPSs) have enabled navigation services for mobile handsets in outdoor environments. Global navigation satellite systems ("GNSS"), such as the GPS, Galilleo, GLONASS and the like, may enable a terrestrial navigation receiver to process one or more SPS signals transmitted from transmitters fixed to space vehicles ("SV's") to obtain pseudorange measurements from the navigation receiver to the transmitters. With pseudorange measurements to a sufficient number of transmitters and knowledge of locations of the transmitters, the navigation receiver may estimate its location. An SPS signal may be encoded with a repeating sequential code. In one implementation, a receiver may attempt to determine a pseudorange measurement from an acquired SPS signal based, at least in part, on a detected code phase associated with the acquired SPS signal using well known techniques.

Various techniques are described herein which may be implemented in one or more land-based computing platforms or an MS, or a combination thereof, to provide to an MS (or another MS) positioning assistance data, which the MS may use to determine its location, for example. In a particular example, such techniques may be used to provide positioning assistance data from a synchronous network to an MS that may be on an asynchronous network. In another particular example, such techniques may be used to provide positioning assistance data from a synchronous network to an MS that may be on a same or different synchronous network. Such techniques may be beneficial in that synchronous networks operate using a time reference that may be substantially more accurate than a time reference used for asynchronous networks. Accordingly, for example, accuracy of a time reference of an MS on an asynchronous network may be substantially improved by providing a time reference of an MS on a synchronous network to the MS on the asynchronous network.

A device (e.g., an MS) in a "synchronous network" as indicated herein is directed to a device that may transmit a signal modulated by a time reference that is synchronized with a known clock. For example, GPS, or other GNSS, may transmit a signal that is modulated with a data signal comprising a time reference that is synchronized with a GPS clock. Also, certain cellular communication systems such as COMA, for example, are synchronized with a known dock. In contrast, a device in an "asynchronous network" may operate with a time reference that is not synchronized to a dock that is known by the device. Certain cellular communication systems including, for example, GSM and WCDMA, may appear to an MS as asynchronous.

A time reference in an asynchronous network may be of limited use to an MS in attempting to measure ranges to transmitters of SV's, land-based stations, or other MS's based on a measured signal travel time. On the other hand, an MS in an asynchronous network may obtain a relatively accurate dock model from an MS in a synchronous network. By having an accurate dock model for modeling timing of signals transmitted by SV's, land-based stations, or other MS's, an MS in an asynchronous network may be better capable of obtaining relatively accurate pseudorange measurements to the particular transmitters.

In an embodiment, a method performed at a first MS may be used to provide positioning assistance data to a second MS. The first MS, which may be in a synchronous network, for example, may receive a request for positioning assistance data from a second MS over a communication link. Such a request for positioning assistance data may comprise a broadcast request available to one or more MS's in addition to the first MS, for example. In response to such a request, the first MS may transmit one or more messages to the second MS, wherein the one or more messages may include the requested positioning assistance data. Positioning assistance data may comprise, among other things, at least a current time according to the synchronous network of the first MS. Positioning assistance data may also comprise a time uncertainty of the current time. In another example, positioning assistance data may comprise Doppler windows. In one implementation, the second MS may be in an asynchronous network. In another implementation, the second MS may be in a synchronous network different or the same as that of the first MS. Though claimed subject matter is not so limited, a communication link between or among MS's may comprise a peer-to-peer communication link.

In one embodiment, a peer-to-peer communication link may comprise a communication link between or among two or more devices, such as MS's, in which the individual devices may act as either a client or a server for the other devices. For example, individual devices in a peer-to-peer communication link may share resources among one another. This is in contrast to a traditional client-server configuration where only a server provides services or data while clients only receive the services or data, for example. Accordingly, a peer-to-peer communication link may allow shared access to various resources such as files, peripheral devices, and/or sensors a need not involve a central server, for example.

According to an embodiment, an MS on an asynchronous carrier network may be capable of communicating with peer MS's over a peer-to-peer wireless communication link using any one of several wireless communication enabling technologies such as, for example, IEEE std. 802.11, ZigBee, Wi-Fi, or Bluetooth™. Furthermore, an MS may employ a peer-to-peer communication software application such as AllJoyn™, available from Qualcomm Incorporated of San Diego, Calif. Of course, any of a number of other wireless communication enabling technologies or peer-to-peer communication software applications may be used, and claimed subject matter is not so limited. In a particular implementation, an MS on an asynchronous network may attempt to communicate with peer MS's on a synchronous network to obtain positioning assistance data such as, for example, an accurate time reference to GPS time.

In an embodiment, a method performed at a first MS may be used to receive positioning assistance data from a second MS. The second MS, which may be in a synchronous network, for example, may receive a request for positioning assistance data from the first MS over a communication link. The first MS may transmit a broadcast message through the wireless communication link requesting positioning assistance data. The first MS may receive, in response to its broadcast message, one or more response messages from the second MS in the synchronous network. Among other things, the one or more response messages may include the requested positioning assistance data. Subsequently, the first MS may apply the positioning assistance data to acquisition of an SPS or land-based signal. For example, in a case where the positioning assistance data comprises an estimate of time according to a synchronous carrier network, the estimate of time may be used to obtain pseudorange measurements to SV or land-based transmitters. As explained above, an MS may be capable of obtaining more accurate pseudorange measurements to transmitters if the MS is in possession of an estimate of time based on a time reference of a synchronous network rather than an estimate of time based on a time reference of an asynchronous network.

In one implementation, positioning assistance data may comprise Doppler windows. In another implementation, positioning assistance data may comprise a time uncertainty of the current time in addition to an estimate of time. For example, a time measuring device may provide a time "T" (e.g., with respect to a reference epoch), and provide a corresponding time uncertainty "dT". Accordingly, a true value of time at that instant may range from T−dT to T+dT. The smaller the value of "dT", the smaller the time uncertainty. Smaller time uncertainties may provide a benefit, for example, in that searches for entities such as a signal in a time window may rely on less computing power and/or less battery power compared to such searches associated with relatively large time uncertainties.

A first MS may determine whether a received estimate of time according to a synchronous network is more accurate than an estimate of time that the first MS already possessed before receiving the estimate of time. Such a determination may be based, at least in part, on the time uncertainty. For example, an estimate of time in possession of the first MS before receiving a estimate of time from another MS may comprise a time reference based, at least in part, on an internal clock of the first MS. In one implementation, the first MS may be on an asynchronous network. In another implementation, however, the first MS may be on a synchronous network different or the same as that of the second MS. Though claimed subject matter is not so limited, a communication link may comprise a peer-to-peer communication link.

In an embodiment, a method performed at a first MS may be used to determine whether an estimate of time received from a second MS is more accurate than an estimate of time already possessed by the first MS. In other words, such a method may allow an MS to select a most accurate time measurement among two or more options: a time estimate obtained by the MS or time estimates obtained by one or more other MS's. In particular, such a method may comprise transmitting a broadcast message through a wireless communication link requesting positioning assistance data. In one example, a first MS may broadcast such a message and one or more other MS's may receive the message. The first MS may subsequently receive one or more response messages from a second MS, a third MS, and so on. Either or both of the second or third MS's (or any other MS's present) may be on a synchronous network. One or more of the response messages may include the requested positioning assistance data, which may comprise a first time uncertainty corresponding to the second MS and a second time uncertainty corresponding to the third MS, for example. The first MS may compare the first and second time uncertainties to determine whether to apply the positioning assistance data of the second MS or the third MS to obtain pseudorange measurements to SV or land-based transmitters. For example, if positioning assistance data of the second MS is more accurate than that of the third MS, the first MS may use the positioning assistance data of the second MS for acquisition of an SPS signal.

In another example, a broadcasting MS may transmit time and time uncertainty, Doppler values and Doppler uncertainty values, and all receiving MS's in a broadcast network may compare the values broadcasted with their internal values. Only MS's which have a better uncertainty values may respond FIG. 1 is a schematic block diagram of a communications network 100 comprising first MS's 112 and second MS's 116. For example, first MS's 112 may comprise one or more individual MS's and second MS's 116 may also comprise one or more individual MS's. Communications network 100 may comprise a cellular communications network capable of enabling voice or data communication for a number of MS's including first MS's 112 and second MS's 116. In one implementation, individual MS's of first MS's 112 may communicate between or among one or another via peer-to-peer communication links (not shown in FIG. 1). Similarly, individual MS's of second MS's 116 may communicate between or among one or another via peer-to-peer communication links. Such communication links are discussed below, in reference to FIG. 2, for example.

Communication network 100 may include a first server 102, a second server 106, a network 104, an asynchronous or synchronous wireless network 108, SV's 110, and base stations 114. Communications network 100 may include numerous base stations 114 that enable MS's such as MS's 112 and 116 to access wireless network 108. Base stations 114 may be grouped or categorized based on geographic data, historical data, predictive patterns, traffic flow, or any combination thereof. The particular configuration of base stations depicted in FIG. 1 is merely an example configuration and claimed subject matter is not limited in this respect.

SV's 110 may be associated with one or more GNSS' such as, GPS, GLONASS, and Galileo, although the scope of claimed subject matter is not limited in this respect. First MS's 112 and/or second MS's 116 may acquire signals transmitted from satellites 110 to, among other things, obtain a position fix.

In another aspect, position determination calculations may be performed by a network entity such as, for example, a first server 102 and/or second server 106, rather than by a first MS 112 and/or second MS 116. Such calculations may be based, at least in part, on signals acquired by first MS 112 and/or second MS 116 from one or more of base stations 114. In a further aspect, first server 102 and/or second server 106 may transmit a calculated position to first MS 112 and/or second MS 116.

First server 102 may be connected to (communicate with) second server 106 via network 104 and connected (communicate with) first MS 112 and/or second MS 116 via wireless network 108. In particular implementations, network 104 and wireless network 108 may facilitate communication with Internet Protocol packets. However, other communication formats may be used. First server 102 may utilize a first communication link 118 to transmit assistance messages to first MS's 112 via wireless network 108. Second server 106 may utilize a second communication link 120 to transmit assistance messages to second MS's 116 via wireless network 108.

Figure 2:
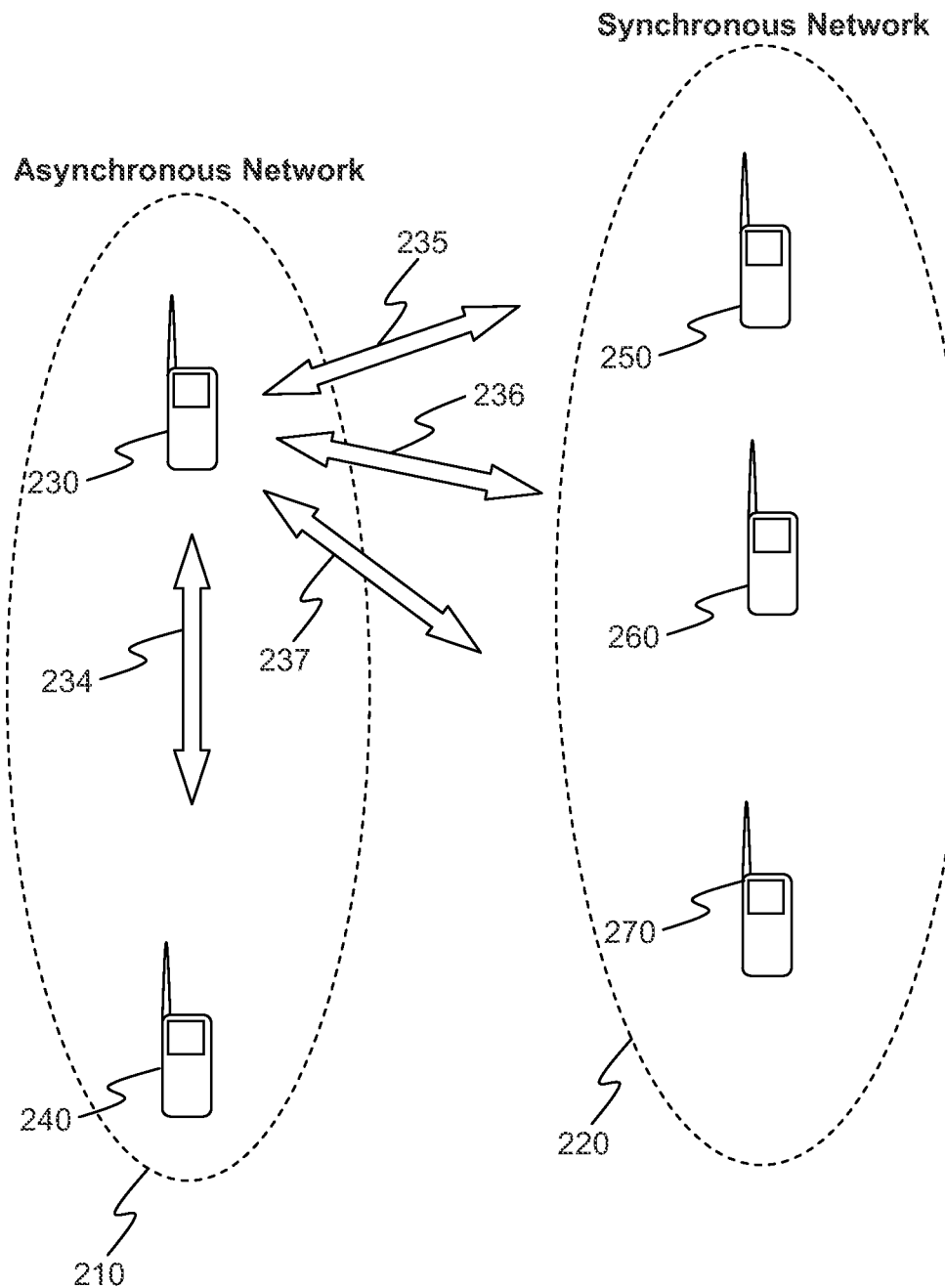
FIG. 2 is a schematic diagram of asynchronous and synchronous networks, according to an implementation.

FIG. 2 is a schematic diagram of a communication network comprising asynchronous networks 210 and synchronous networks 220, according to an implementation. For example, communication network 200 may comprise a portion of communication network 100 shown in FIG. 1. FIG. 2 illustrates a particular implementation in which MS 230 and MS 240 are on asynchronous network 210 and MS 250, MS 260, and MS 270 are on synchronous network 220. Though particular numbers of MS's are shown in these networks, claimed subject matter is not limited in this respect.

MS's shown in networks 210 and 220 may communicate between or among one another via peer-to-peer communication links. For example: MS 230 may communicate with MS 240, MS 250, MS 260, and MS 270 via peer-to-peer communication links 234, 235, 236, and 237, respectively.

Figure 3:
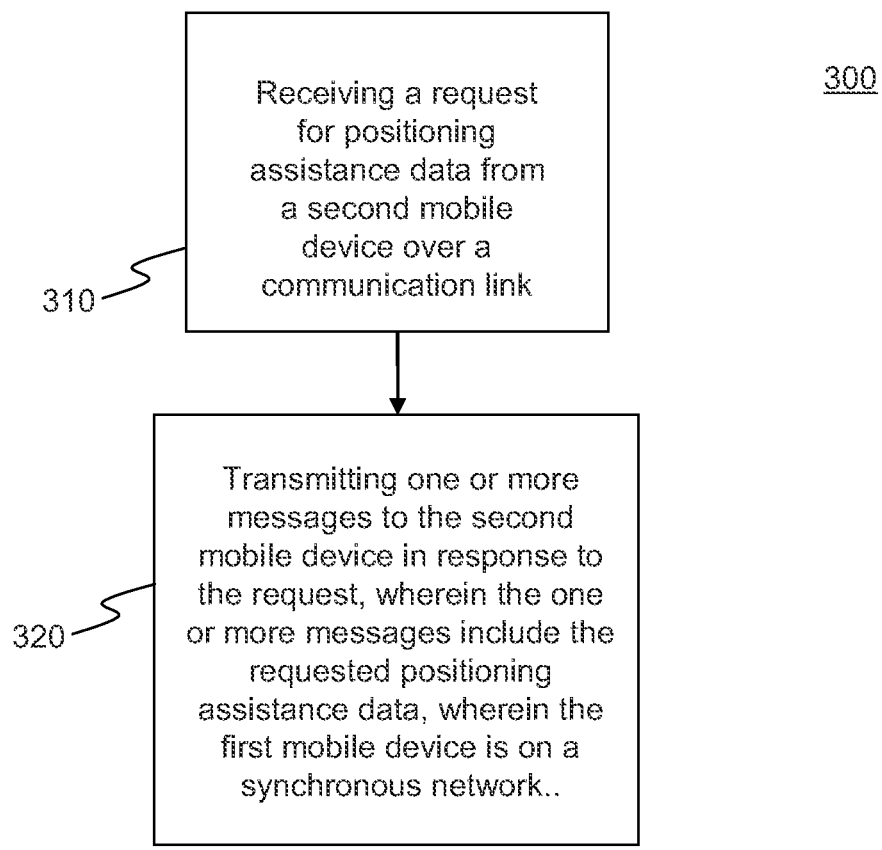
FIG. 3 is a flow diagram of a process for providing position assistance data to a mobile station, according to an implementation.

FIG. 3 is a flow diagram of a process 300 for providing position assistance data to an MS, according to an implementation. For example, process 300 may be performed by MS 250 in FIG. 2. At block 310, MS 250 in synchronous network 220, for example, may receive a request for positioning assistance data from MS 230 over communication link 235, which may comprise a peer-to-peer communication link. Such a request by MS 230 for positioning assistance data may comprise a broadcast request available to MS's 240, 250, 260, and 270, for example. At block 320, in response to such a request, the MS 250 may transmit one or more messages to MS 230, wherein the one or more messages may include the requested positioning assistance data. As mentioned above, positioning assistance data may comprise, among other things, at least a current time according to synchronous network 220 of MS 250. Positioning assistance data may also comprise a time uncertainty of the current time. In another example, positioning assistance data may comprise Doppler windows. Of course, such details of process 300 are merely examples, and claimed subject matter is not so limited.

Though in the example just given, the requesting MS 230 is in an asynchronous network, process 300 may instead involve a requesting MS in a synchronous network. For example, MS 260 or MS 270 may broadcast a request for position assistance data, and MS 250 may receive and respond to such a request. In another example, an MS in a synchronous network other than 220 may broadcast a request for position assistance data. Though claimed subject matter is not so limited, communication links between or among MS's recited above may or may not comprise peer-to-peer communication links.

Figure 4:
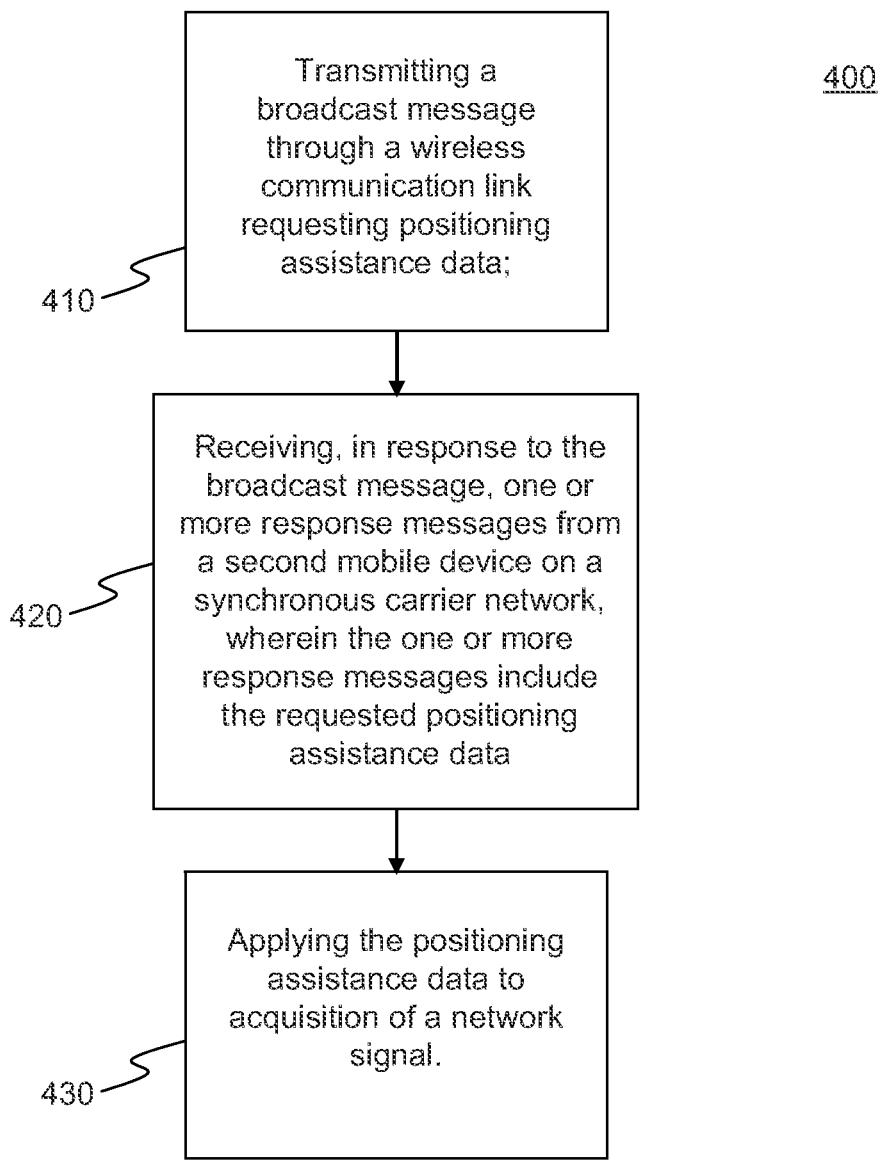
FIG. 4 is a flow diagram of a process for receiving position assistance data from a mobile station, according to an implementation.

FIG. 4 is a flow diagram of a process 400 for receiving position assistance data from an MS, according to an implementation. For example, process 400, which may be performed at an MS, such as 230, may be used by the MS to receive positioning assistance data from a second MS, such as 250, which may be in synchronous network 220. MS 250 may receive a request for positioning assistance data from MS 230 over communication link 235. At block 410, MS 230 may broadcast a message through the wireless communication links 235, 236, and 237 requesting positioning assistance data. At block 420, MS 230 may receive, in response to its broadcast message, one or more response messages from MS 250 in the synchronous network. Among other things, the one or more response messages may include the requested positioning assistance data. Subsequently, at block 430, MS 230 may apply the positioning assistance data to acquisition of a network signal, such as, for example, an SPS signal or a land-based signal. For example, in a case where the positioning assistance data comprises a estimate of time according to a synchronous carrier network, the estimate of time may be used to obtain pseudorange measurements to SV's 110 or land-based transmitters 114, shown in FIG. 1. Communication links between or among MS's recited above may or may not comprise peer-to-peer communication links. Of course, such details of process 400 are merely examples, and claimed subject matter is not so limited.

Figure 5:
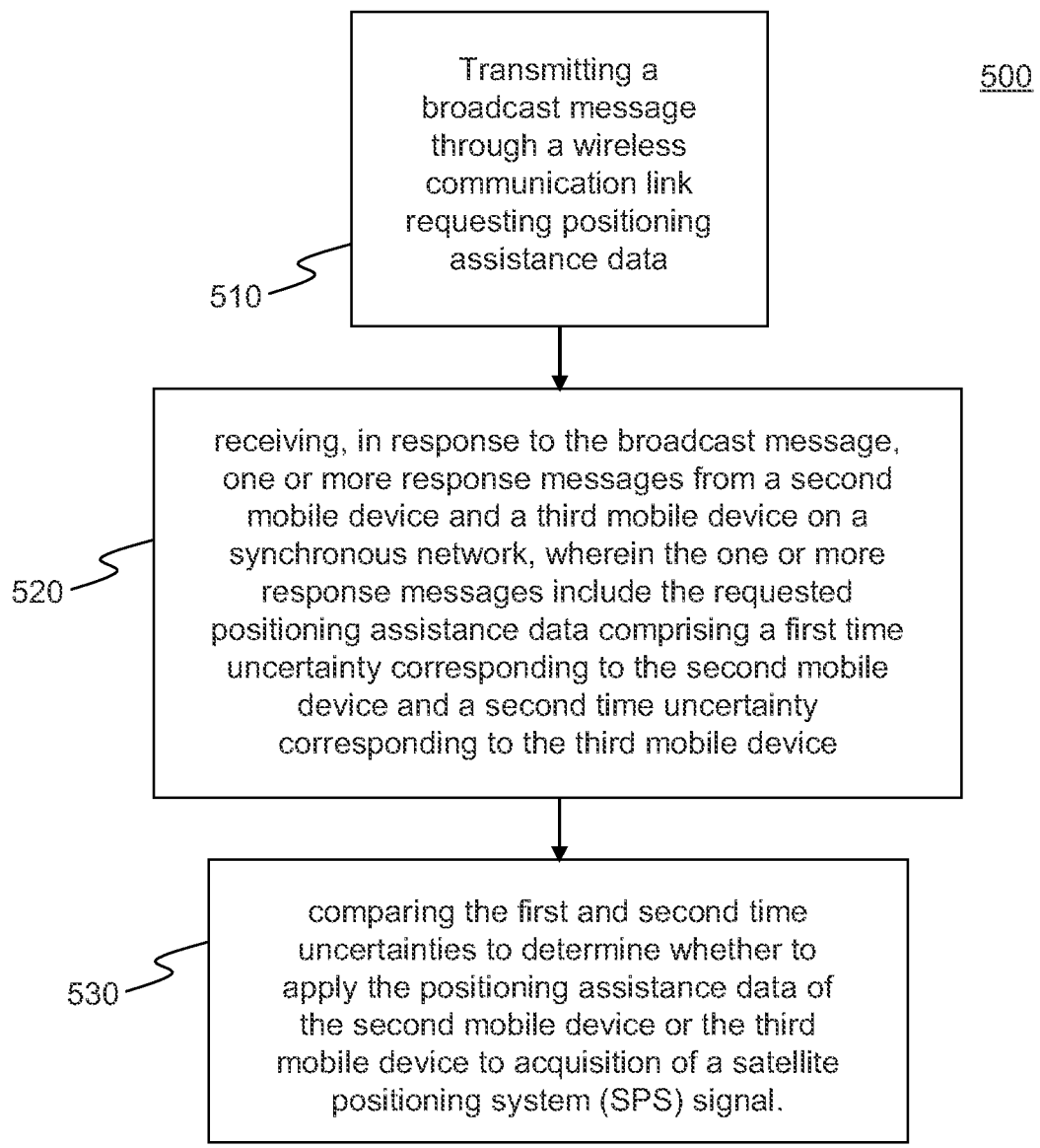
FIG. 5 is a flow diagram of a process for receiving position assistance data from a mobile station, according to another implementation.

FIG. 5 is a flow diagram of a process 500 for receiving position assistance data from an MS, according to another implementation. For example, process 500, which may be performed at an MS on a asynchronous network, may be used to receive positioning assistance data from one or more other MS's, which may be in one or more synchronous networks. For example, referring to FIG. 2, at block 510, MS 230 may broadcast a message through wireless communication links 235, 236, and 237 requesting positioning assistance data. At block 520, MS 230 may receive, in response to its broadcast message, one or more response messages from any of MS 250, MS 260, or MS 270 in synchronous network 220. Among other things, the one or more response messages may include the requested positioning assistance data from individual MS's, which may comprise a current time and a time uncertainty according to the individual MS's. Though current time values and time uncertainties of the individual MS's may be based, at least in part, on the same synchronous network (e.g., 220), different circumstances of each MS may lead to each MS having a different current time value and time uncertainty. For example, one MS may have received a time update from a network server more recently than that of another MS, which may be in a poor reception area. In another example, different MS's may operate with different applications or firmware and so may receive time updates from a network server at different rates.

Accordingly, at block 530, MS 230 may compare time and time uncertainties of the individual MS's to one another and select the most accurate one to apply to acquisition of an SPS or land-based signal. In one implementation, the most accurate current time value, as indicated by its corresponding time uncertainty, for example, may be used to obtain pseudorange measurements to SV's 110 or land-based transmitters 114, shown in FIG. 1. Communication links between or among MS's recited above may or may not comprise peer-to-peer communication links. Of course, such details of process 500 are merely examples, and claimed subject matter is not so limited.

Figure 6:
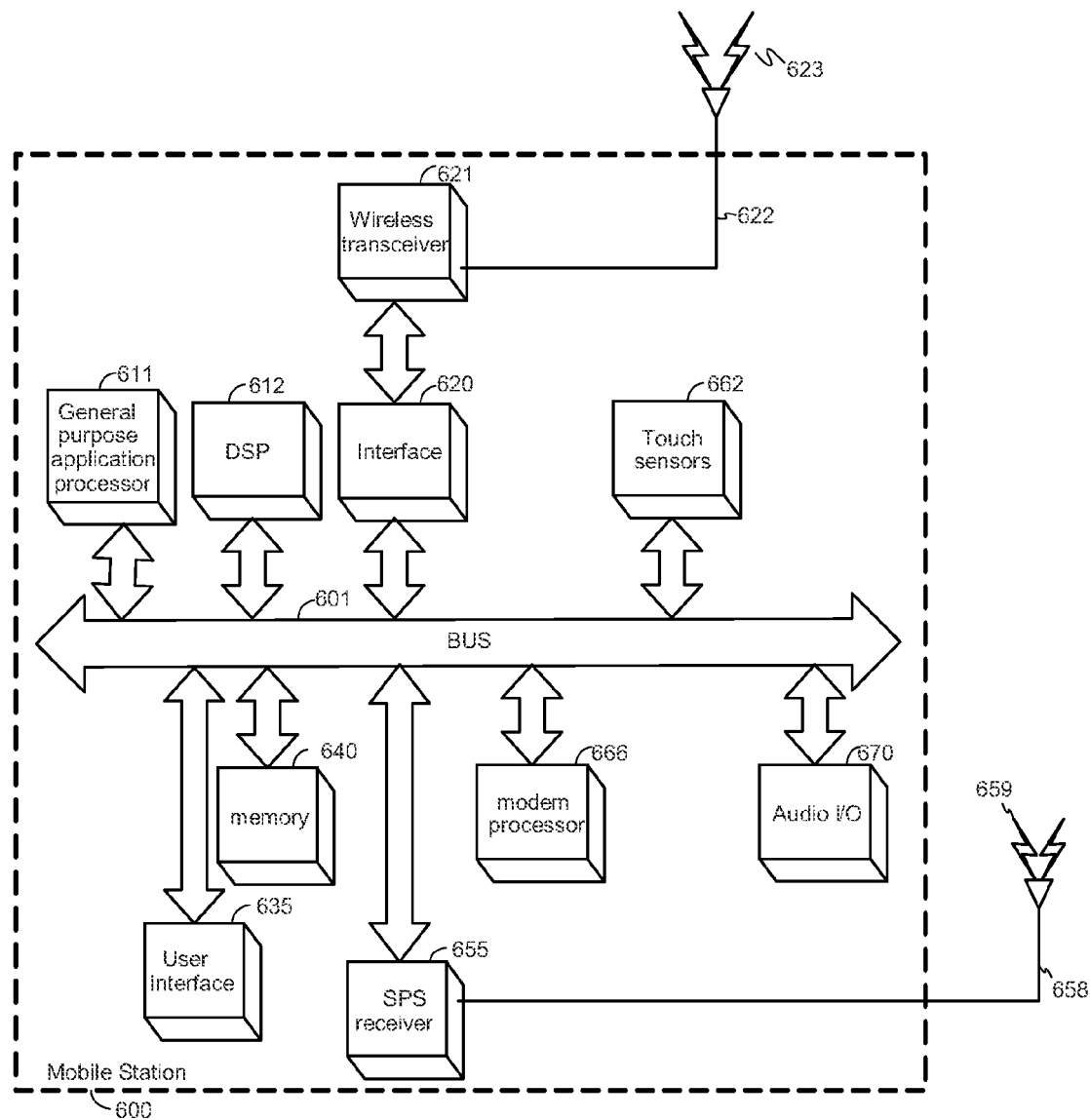
FIG. 6 is a schematic diagram of a mobile station according to an implementation.

FIG. 6 is a schematic block diagram of an MS 600, according to an implementation. MS 600 may comprise one or more features of MS's 112 or 116, shown in FIG. 1, for example. In certain implementations, MS 600 may also comprise a wireless transceiver 621 which is capable of transmitting and receiving wireless signals 623 via an antenna 622 over a wireless communication network, such as communications network 100 shown in FIG. 1 or peer-to-peer communication links to other MS's, for example.

In one embodiment, MS 600 may be operated on an asynchronous carrier network and may be capable of communicating with peer MS's over a peer-to-peer wireless communication link using any one of several wireless communication enabling technologies, as mentioned above. Such wireless communication enabling technologies may comprise IEEE std. 802.11, ZigBee, Wi-Fi, or Bluetooth, just to name a few examples. Furthermore, MS 600 may employ a peer-to-peer communication software application such as AllJoyn. In a particular implementation, MS 600 operating on an asynchronous network may attempt to communicate with peer MS's on a synchronous network to obtain positioning assistance data such as, for example, an accurate time reference to GPS time, for example.

Wireless transceiver 621 may be connected to bus 601 by a wireless transceiver bus interface 620. Wireless transceiver bus interface 620 may, in some implementations be at least partially integrated with wireless transceiver 621. Some implementations may include multiple wireless transceivers 621 and wireless antennas 622 to enable transmitting and/or receiving signals according to a corresponding multiple wireless communication standards such as, for example, WiFi, CDMA, WCDMA, LTE and Bluetooth, just to name a few examples.

MS 600 may also comprise SPS receiver 655 capable of receiving and acquiring SPS signals 659 via SPS antenna 658. SPS receiver 655 may also process, in whole or in part, acquired SPS signals 659 for estimating a location of MS 600. In some implementations, general-purpose processor(s) 611, memory 640, DP(s) 612 and/or specialized processors (not shown) may also be utilized to process acquired SPS signals, in whole or in part, and/or calculate an estimated location of MS 600, in conjunction with SPS receiver 655. Storage of SPS or other signals for use in performing positioning operations may be performed in memory 640 or registers (not shown).

Also shown in FIG. 6, MS 600 may comprise digital signal processor(s) (DSP(s)) 612 connected to the bus 601 by a bus interface 610, general-purpose processor(s) 611 connected to the bus 601 by a bus interface 610 and memory 640. Bus interface 610 may be integrated with the DSP(s) 612, general-purpose processor(s) 611 and memory 640. In various implementations, functions or processes, such as processes 300, 400, and/or 500 shown in FIGS. 3, 4, and/or 5, for example, may be performed in response to execution of one or more machine-readable instructions stored in memory 640 such as on a computer-readable storage medium, such as RAM, ROM, FLASH, or disc drive, just to name a few example. The one or more instructions may be executable by general-purpose processor(s) 611, specialized processors, or DSP(s) 612. In one implementation, for example, one or more machine-readable instructions stored in memory 640 may be executable by a processor(s) 611 to: process a request for positioning assistance data from another MS over a communication link. 611 may further initiate transmission of one or more messages to the other MS in response to the request, wherein the messages include the requested positioning assistance data, wherein MS 600 is on a synchronous network. In some embodiments, the requested positioning assistance data may comprise at least a current time according to the synchronous network and a time uncertainty. In some embodiments, the other MS may be on an asynchronous network such as 220, for example.

Memory 640 may comprise a non-transitory processor-readable memory and/or a computer-readable memory that stores software code (programming code, instructions, etc.) that are executable by processor(s) 611 and/or DSP(s) 612 to perform functions described herein such as, but not limited to, processes 300, 400, and/or 500, for example. In some embodiments, the processor(s) 611 and/or DSP(s) 612 perform, in combination with the memory 640, one or more of blocks 310-320, 410-430, and/or 510-530.

Also shown in FIG. 6, a user interface 635 may comprise any one of several devices such as, for example, a speaker, microphone, display device, vibration device, keyboard, touch screen, just to name a few examples. In a particular implementation, user interface 635 may enable a user to interact with one or more applications hosted on MS 600. For example, devices of user interface 635 may store analog or digital signals on memory 640 to be further processed by DSP(s) 612 or general purpose processor 611 in response to action from a user. Similarly, applications hosted on MS 600 may store analog or digital signals on memory 640 to present an output signal to a user. In another implementation, MS 600 may optionally include a dedicated audio input/output (I/O) device 670 comprising, for example, a dedicated speaker, microphone, digital to analog circuitry, analog to digital circuitry, amplifiers and/or gain control. It should be understood, however, that this is merely an example of how an audio I/O may be implemented in an MS, and that claimed subject matter is not limited in this respect. In another implementation, MS 600 may comprise touch sensors 662 responsive to touching or pressure on a keyboard or touch screen device.

In a particular implementation, MS 600 may comprise a dedicated modem processor 666 capable of performing baseband processing of signals received and downconverted at wireless transceiver 621 or SPS receiver 655. Similarly, modem processor 666 may perform baseband processing of signals to be upconverted for transmission by wireless transceiver 621. In alternative implementations, instead of having a dedicated modem processor, baseband processing may be performed by a general purpose processor or DSP (e.g., general purpose processor 611 or DSP(s) 612). It should be understood, however, that these are merely examples of structures that may perform baseband processing, and that claimed subject matter is not limited in this respect.

Figure 7:
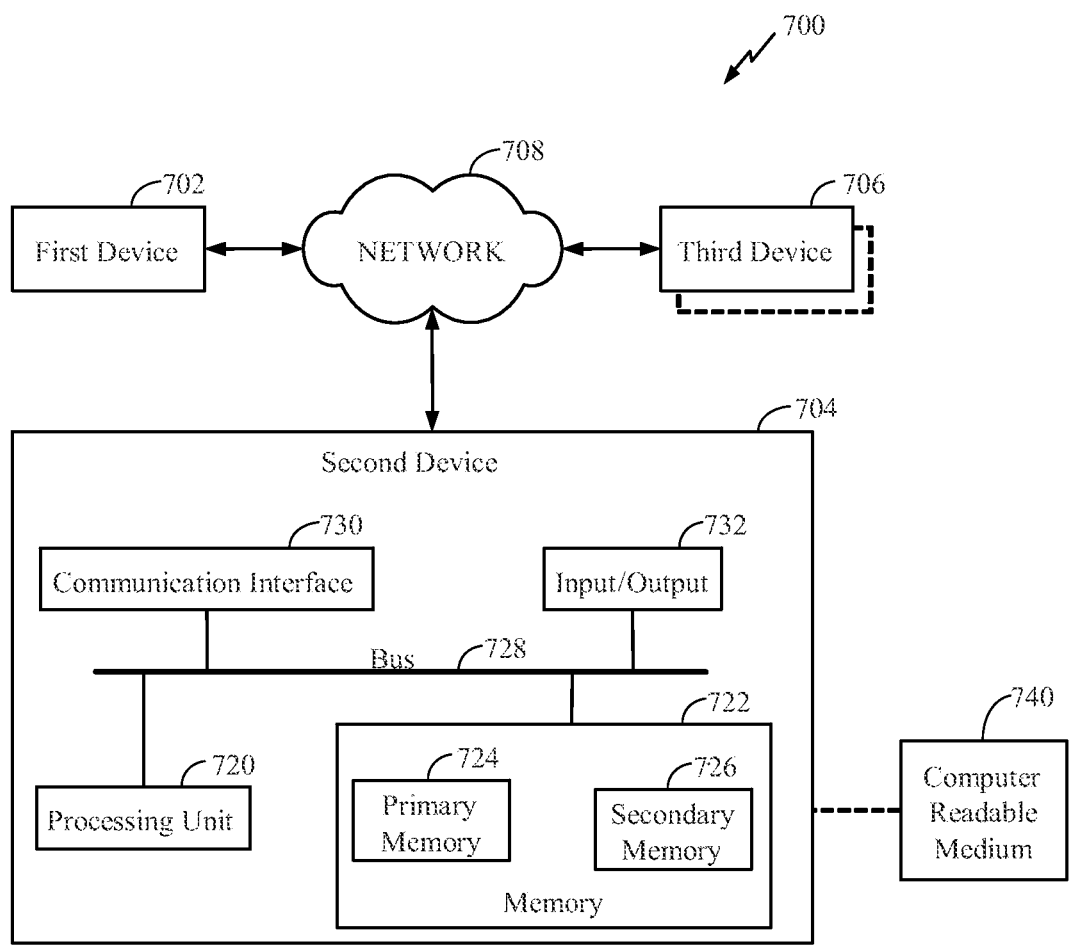
FIG. 7 is a schematic diagram of a network computing environment according to an implementation.

FIG. 7 is a schematic block diagram illustrating an example system 700 that may include one or more devices configurable to implement techniques or processes, such as processes 300, 400, and/or 500 described above, for example. System 700 may include, for example, a first device 702, a second device 704, and a third device 706, which may be operatively coupled together through a synchronous or asynchronous wireless communications network 708. In an aspect, first device 702 may comprise a server capable of providing positioning assistance data such as, for example, a base station almanac or time and time uncertainty. First device 702 may also comprise a server capable of providing an LCI to a requesting MS based, at least in part, on a rough estimate of a location of the requesting MS. First device 702 may also comprise a server capable of providing indoor positioning assistance data relevant to a location of an LCI specified in a request from an MS. Second and third devices 704 and 706 may comprise MS's, in an aspect. Also, in an aspect, wireless communications network 708 may comprise one or more wireless access points, for example. However, claimed subject matter is not limited in scope in these respects.

First device 702, second device 704 and third device 706, as shown in FIG. 7, may be representative of any device, appliance or machine that may be configurable to exchange data over wireless communications synchronous or asynchronous network 708. By way of example but not limitation, any of first device 702, second device 704, or third device 706 may include: one or more computing devices or platforms, such as, e.g., a desktop computer, a laptop computer, a workstation, a server device, or the like; one or more personal computing or communication devices or appliances, such as, e.g., a personal digital assistant, mobile communication device, or the like; a computing system or associated service provider capability, such as, e.g., a database or data storage service provider/system, a network service provider/system, an Internet or intranet service provider/system, a portal or search engine service provider/system, a wireless communication service provider/system; or any combination thereof. Any of the first, second, and third devices 702, 704, and 706, respectively, may comprise one or more of a base station almanac server, a base station, or an MS in accordance with the examples described herein. For example, second device may comprise a server or AP, though claimed subject matter is not so limited.

Similarly, wireless communications network 708, as shown in FIG. 7, is representative of one or more synchronous or asynchronous communication links, processes, or resources configurable to support the exchange of data between at least two of first device 702, second device 704, and third device 706. By way of example but not limitation, wireless communications network 708 may include wireless or wired communication links, telephone or telecommunications systems, data buses or channels, optical fibers, terrestrial or space vehicle resources, local area networks, wide area networks, intranets, the Internet, routers or switches, and the like, or any combination thereof. As illustrated, for example, by the dashed lined box illustrated as being partially obscured of third device 706, there may be additional like devices operatively coupled to wireless communications network 708.

It is recognized that all or part of the various devices and networks shown in system 700, and the processes and methods as further described herein, may be implemented using or otherwise including hardware, firmware, software, or any combination thereof.

Processing unit 720 is representative of one or more circuits configurable to perform at least a portion of a data computing procedure or process. By way of example but not limitation, processing unit 720 may include one or more processors, controllers, microprocessors, microcontrollers, application specific integrated circuits, digital signal processors, programmable logic devices, field programmable gate arrays, and the like, or any combination thereof. In one embodiment, processing unit 720, for example, may perform processes 300, 400, and/or 500, or a portion thereof, for example one or more of blocks 310-320, 410-430, and/or 510-530.

Memory 722 is representative of any data storage mechanism. Memory 722 may include, for example, a primary memory 724 or a secondary memory 726. Primary memory 724 may include, for example, a random access memory, read only memory, etc. While illustrated in this example as being separate from processing unit 720, it should be understood that all or part of primary memory 724 may be provided within or otherwise co-located/coupled with processing unit 720, such a via bus 728, for example.

Secondary memory 726 may include, for example, the same or similar type of memory as primary memory or one or more data storage devices or systems, such as, for example, a disk drive, an optical disc drive, a tape drive, a solid state memory drive, etc. In certain implementations, secondary memory 726 may be operatively receptive of, or otherwise configurable to couple to, a computer-readable medium 740. Computer-readable medium 740 may include, for example, any non-transitory medium that can carry or make accessible data, code or instructions for one or more of the devices in system 700. Computer-readable medium 740 may also be referred to as a storage medium.

Second device 704 may include, for example, a communication interface 730 that provides for or otherwise supports the operative coupling of second device 704 to at least wireless communications network 708. By way of example but not limitation, communication interface 730 may include a network interface device or card, a modem, a router, a switch, a transceiver, and the like.

Second device 704 may include, for example, an input/output device 732. Input/output device 732 is representative of one or more devices or features that may be configurable to accept or otherwise introduce human or machine inputs, or one or more devices or features that may be configurable to deliver or otherwise provide for human or machine outputs. By way of example but not limitation, input/output device 732 may include an operatively configured display, speaker, keyboard, mouse, trackball, touch screen, data port, etc.

The methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is here, and generally, is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Wireless communication techniques described herein may be in connection with various wireless communications networks such as a wireless wide area network ("MAN"), a wireless local area network ("WLAN"), a wireless personal area network (WPAN), and so on. The term "network" and "system" may be used interchangeably herein. A WWAN may be a Code Division Multiple Access ("COMA") network, a Time Division Multiple Access ("TDMA") network, a Frequency Division Multiple Access ("FDMA") network, an Orthogonal Frequency Division Multiple Access ("OFDMA") network, a Single-Carrier Frequency Division Multiple Access ("SC-FDMA") network, or any combination of the above networks, and so on. A CDMA network may implement one or more radio access technologies ("RATs") such as cdma2000, Wideband-CDMA ("W-CDMA"), to name just a few radio technologies. Here, cdma2000 may include technologies implemented according to IS-95, IS-2000, and IS-856 standards. A TDMA network may implement Global System for Mobile Communications ("GSM"), Digital Advanced Mobile Phone System ("O-AMPS"), or some other RAT. GSM and W-CDMA are described in documents from a consortium named "3rd Generation Partnership Project" ("3GPP"). Cdma2000 is described in documents from a consortium named "3rd Generation Partnership Project 2" ("3GPP2"). 3GPP and 3GPP2 documents are publicly available. 4G Long Term Evolution ("LTE") communications networks may also be implemented in accordance with claimed subject matter, in an aspect. A WLAN may comprise an IEEE 802.11x network, and a WPAN may comprise a Bluetooth network, an IEEE 802.15x, for example. Wireless communication implementations described herein may also be used in connection with any combination of WWAN, WLAN or WPAN.

In another aspect, as previously mentioned, a wireless transmitter or access point may comprise a femto cell, utilized to extend cellular telephone service into a business or home. In such an implementation, one or more MS's may communicate with a femto cell via a code division multiple access ("CDMA") cellular communication protocol, for example, and the femto cell may provide the MS access to a larger cellular telecommunication network by way of another broadband network such as the Internet.

Techniques described herein may be used with an SPS that includes any one of several GNSS and/or combinations of GNSS. Furthermore, such techniques may be used with positioning systems that utilize terrestrial transmitters acting as "pseudolites", or a combination of SV's and such terrestrial transmitters. Terrestrial transmitters may, for example, include ground-based transmitters that broadcast a PN code or other ranging code (e.g., similar to a GPS or CDMA cellular signal). Such a transmitter may be assigned a unique PN code so as to permit identification by a remote receiver. Terrestrial transmitters may be useful, for example, to augment an SPS in situations where SPS signals from an orbiting SV might be unavailable, such as in tunnels, mines, buildings, urban canyons or other enclosed areas. Another implementation of pseudolites is known as radio-beacons. The term "SV", as used herein, is intended to include terrestrial transmitters acting as pseudolites, equivalents of pseudolites, and possibly others. The terms "SPS signals" and/or "SV signals", as used herein, is intended to include SPS-like signals from terrestrial transmitters, including terrestrial transmitters acting as pseudolites or equivalents of pseudolites.

An access point (AP) may comprise a land-based wireless transmitter that allows an MS, among other wireless devices, to connect to a wired network using Wi-Fi, Bluetooth, or any of a number of other standards, for example. In one implementation, an AP may comprise a personal area network transceiver such as Bluetooth or Zigbee transceivers, for example. In another implementation, an AP may comprise a femto cell, and both terms "AP" and "femto cell" may be used interchangeably unless otherwise indicated. Further, an AP may comprise a base station. In still another implementation, an AP may comprise a wireless network access point, and both terms "AP" and "wireless network access point" may be used interchangeably unless otherwise indicated wireless network access point. For example, a wireless network access point may comprise a network access point to allow one or more MS's to access wireless services, though claimed subject matter is not limited in this respect. A plurality of APs may be placed in a variety of known locations in an area such as an office building, shopping mall, suburban or urban area, and so on.

In a particular implementation, assistance information may be provided to an MS from a local server through synchronous or asynchronous wireless communication links. The MS may then locally store received assistance information in a local memory. Such assistance information may then be shared among one or more MS's via peer-to-peer wireless communication links. It should be understood, however, that in larger indoor areas with multiple access points and feasible routes, such assistance information may be quite voluminous so as to tax available bandwidth in wireless communication links and data storage space on mobile stations.

The terms, "and," and "or" as used herein may include a variety of meanings that will depend at least in part upon the context in which it is used. Typically, "or" if used to associate a list, such as A, B or C, is intended to mean A, B, and C, here used in the inclusive sense, as well as A, B or C, here used in the exclusive sense. Reference throughout this specification to "one example" or "an example" means that a particular feature, structure, or characteristic described in connection with the example is included in at least one example of claimed subject matter. Thus, the appearances of the phrase "in one example" or "an example" in various places throughout this specification are not necessarily all referring to the same example. Furthermore, the particular features, structures, or characteristics may be combined in one or more examples. Examples described herein may include machines, devices, engines, or apparatuses that operate using digital signals. Such signals may comprise electronic signals, optical signals, electromagnetic signals, or any form of energy that provides information between locations.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein. Therefore, it is intended that claimed subject matter not be limited to the particular examples disclosed, but that such claimed subject matter may also include all aspects falling within the scope of appended dams, and equivalents thereof.

The invention claimed is:

1. A method for location determination, said method comprising, at a first mobile station:
   transmitting a broadcast message through a wireless communication link requesting positioning assistance data;
   receiving, in response to said broadcast message, one or more response messages from a second mobile station on a synchronous network, wherein said one or more response messages include said requested positioning assistance data, wherein said positioning assistance data comprises an estimate of time according to said synchronous network and a time uncertainty;
   selecting a time based on a comparison of said received time uncertainty and said received estimate of time to a time possessed by said first mobile station before said receiving; and
   applying said selected time to acquisition of a network signal,
   wherein said first mobile station is on an asynchronous network.

2. The method of claim 1, wherein said network signal comprises a satellite positioning system (SPS) signal.

3. The method of claim 1, wherein said network signal comprises a land-based signal.

4. The method of claim 1, wherein said time possessed by said first mobile station before said receiving comprises a time reference based, at least in part, on an internal clock of said first mobile station.

5. The method of claim 1, wherein said positioning assistance data further comprises Doppler windows.

6. The method of claim 1, wherein said wireless communication link comprises a peer-to-peer communication link.

7. A mobile station comprising:
   a transmitter to transmit a broadcast message through a wireless communication link requesting positioning assistance data;
   a receiver to receive, in response to said broadcast message, one or more response messages from another mobile station on a synchronous network, wherein said one or more response messages include the requested positioning assistance data, wherein said positioning assistance data comprises an estimate of time according to said synchronous network and a time uncertainty; and
   a processor to:
      select a time based on a comparison of said received time uncertainty and said received estimate of time to time possessed by said mobile station before said receiving; and
      apply said selected time to acquisition of a network signal,
   wherein said mobile station is on an asynchronous network.

8. The mobile station of claim 7, wherein said positioning assistance data comprises Doppler windows.

9. The mobile station of claim 7, wherein said wireless communication link comprises a peer-to-peer communication link.

10. An article comprising:
    A storage medium comprising machine-readable instructions stored thereon which are executable by a special purpose computing apparatus in a mobile station to:
       initiate transmission of a broadcast message through a wireless communication link requesting positioning assistance data; and
       receive positioning assistance data from another mobile station on a synchronous network, wherein said positioning assistance data comprises an estimate of time according to said synchronous network and a time uncertainty;
       select a time based on a comparison of said received time uncertainty and said received estimate of time to time possessed by said mobile station before said receiving; and
       apply said selected time to acquisition of a network signal, wherein said positioning assistance data is included in one or more response messages received in response to said broadcast message from another mobile station on a synchronous network and wherein said mobile station is on an asynchronous network.

11. The article of claim 10, wherein said positioning assistance data comprises Doppler windows.

12. The article of claim 10, wherein said wireless communication link comprises a peer-to-peer communication link.

13. A mobile station comprising:
    means for transmitting a broadcast message through a wireless communication link requesting positioning assistance data;
    means for receiving, in response to said broadcast message, one or more response messages from another mobile station on a synchronous network, wherein said one or more response messages include said requested positioning assistance data, wherein said positioning assistance data comprises an estimate of time according to said synchronous network and a time uncertainty;
    means for selecting a time based on a comparison of said received time uncertainty and said received estimate of time to time possessed by said mobile station before said receiving; and
    means for applying said selected time to acquisition of a network signal, wherein said mobile station is on an asynchronous network.

14. The mobile station of claim 13, wherein said positioning assistance data comprises Doppler windows.

15. The mobile station of claim 13, wherein said wireless communication link comprises a peer-to-peer communication link.

16. A method for location determination, said method comprising, at a first mobile station:
    transmitting a broadcast message through a wireless communication link requesting positioning assistance data;
    receiving, in response to said broadcast message, one or more response messages from a second mobile station and a third mobile station on a synchronous network, wherein said one or more response messages include said requested positioning assistance data comprising a first time uncertainty corresponding to said second mobile station and a second time uncertainty corresponding to said third mobile station; and comparing said first and second time uncertainties to determine whether to apply said positioning assistance data of said second mobile station or said third mobile station to acquisition of a satellite positioning system (SPS) signal.

17. The method of claim 16, wherein said first mobile station is on an asynchronous network.

18. The method of claim 16, wherein said positioning assistance data comprises Doppler windows.

19. The method of claim 16, wherein said wireless communication link comprises a peer-to-peer communication link.

* * * * *